US006724180B1

United States Patent
Verfuerth et al.

(10) Patent No.: US 6,724,180 B1
(45) Date of Patent: Apr. 20, 2004

(54) APPARATUS FOR AND METHOD OF METERING SEPARATE LIGHTING CIRCUITS FOR COMPARATIVE ELECTRIC POWER USAGE TO PROVIDE A VIRTUAL POWER PLANT IN ELECTRIC POWER SAVINGS

(76) Inventors: Neal R. Verfuerth, 642 Western Ave., Random Lake, WI (US) 53075; Michael J. Potts, N7203 County Rd. J., Plymouth, WI (US) 53073

(*) Notice: Subject to any disclaimer, the term of this patent is extended or adjusted under 35 U.S.C. 154(b) by 0 days.

(21) Appl. No.: 10/241,846

(22) Filed: Sep. 13, 2002

Related U.S. Application Data

(63) Continuation-in-part of application No. 10/211,851, filed on Aug. 5, 2002, and a continuation-in-part of application No. 10/166,541, filed on Jun. 11, 2002.

(51) Int. Cl.[7] .................................................. G01R 7/00
(52) U.S. Cl. ..................... 324/142; 324/158.1; 315/294; 315/297
(58) Field of Search ............................... 324/103 R, 114, 324/142, 158.1; 702/60, 62; 700/286, 291, 293; 315/294–295, 297, 307–308

(56) References Cited

U.S. PATENT DOCUMENTS

| | | | |
|---|---|---|---|
| 4,701,698 A | 10/1987 | Karlsson et al. | 324/116 |
| 4,749,941 A | 6/1988 | Halder et al. | 324/142 |
| 4,933,633 A | 6/1990 | Allgood | 324/142 |
| 5,315,236 A | 5/1994 | Lee | 324/157 |

*Primary Examiner*—Evan Pert
*Assistant Examiner*—Minh N. Tang
(74) *Attorney, Agent, or Firm*—Robert I. Johnson

(57) ABSTRACT

Lighting of buildings is costly in terms of electric power, and in view of this, disclosure is made of apparatus and method for comparison of electric power usage with incandescent or HID, high intensity discharge, lighting source compared to an alternate lighting source, such as fluorescent tube lights, to give the same or adequate light reading on a light meter as attained by an incandescent or HID, high intensity discharge light source then measuring the ampere reading at the same voltage of each lighting source to determine the KW demand to further determine lowest lighting cost, which then in effect will equate to a virtual power plant, which can be a considerable saving of cost and reduction of atmospheric pollution.

4 Claims, 3 Drawing Sheets

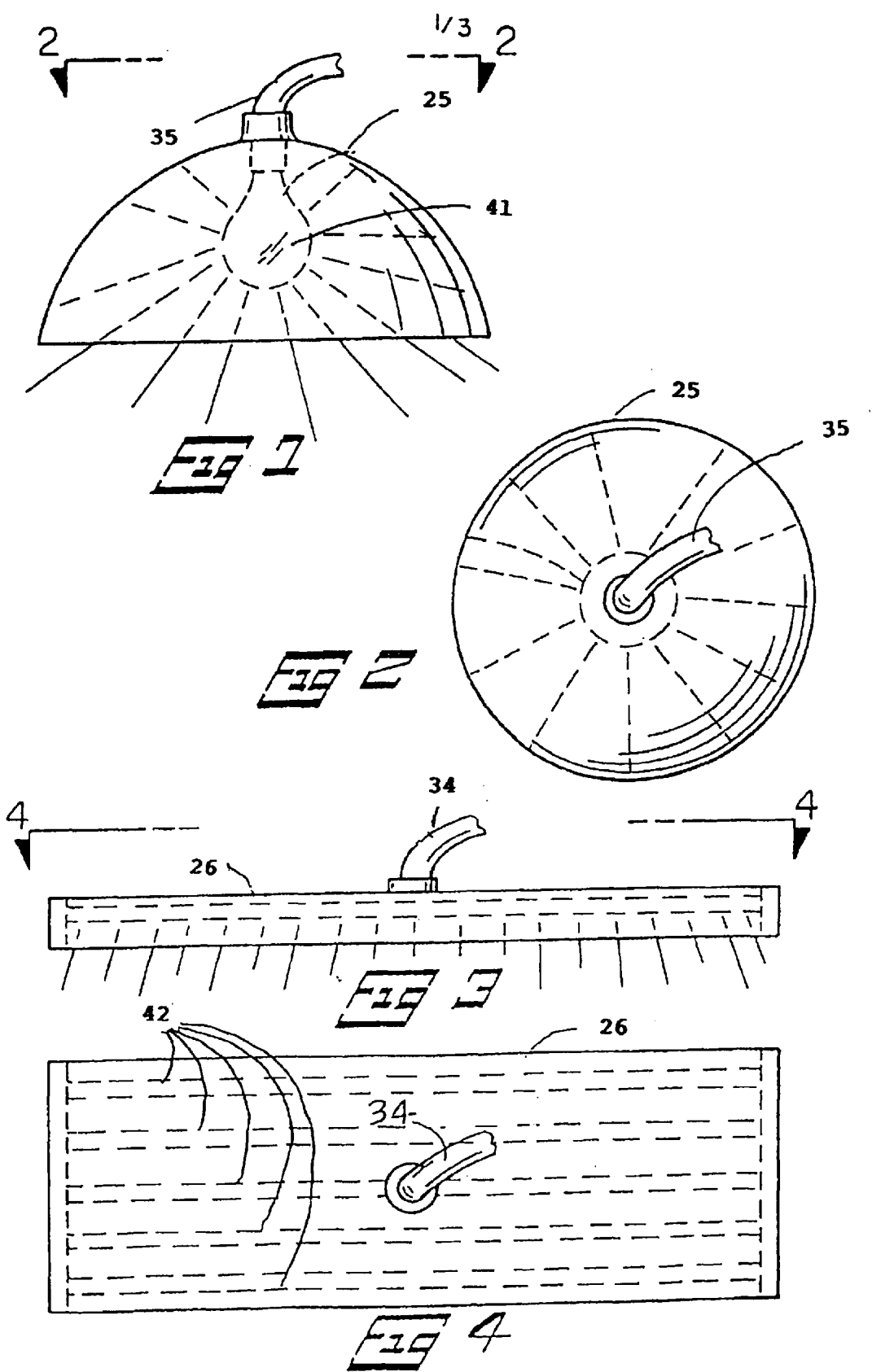

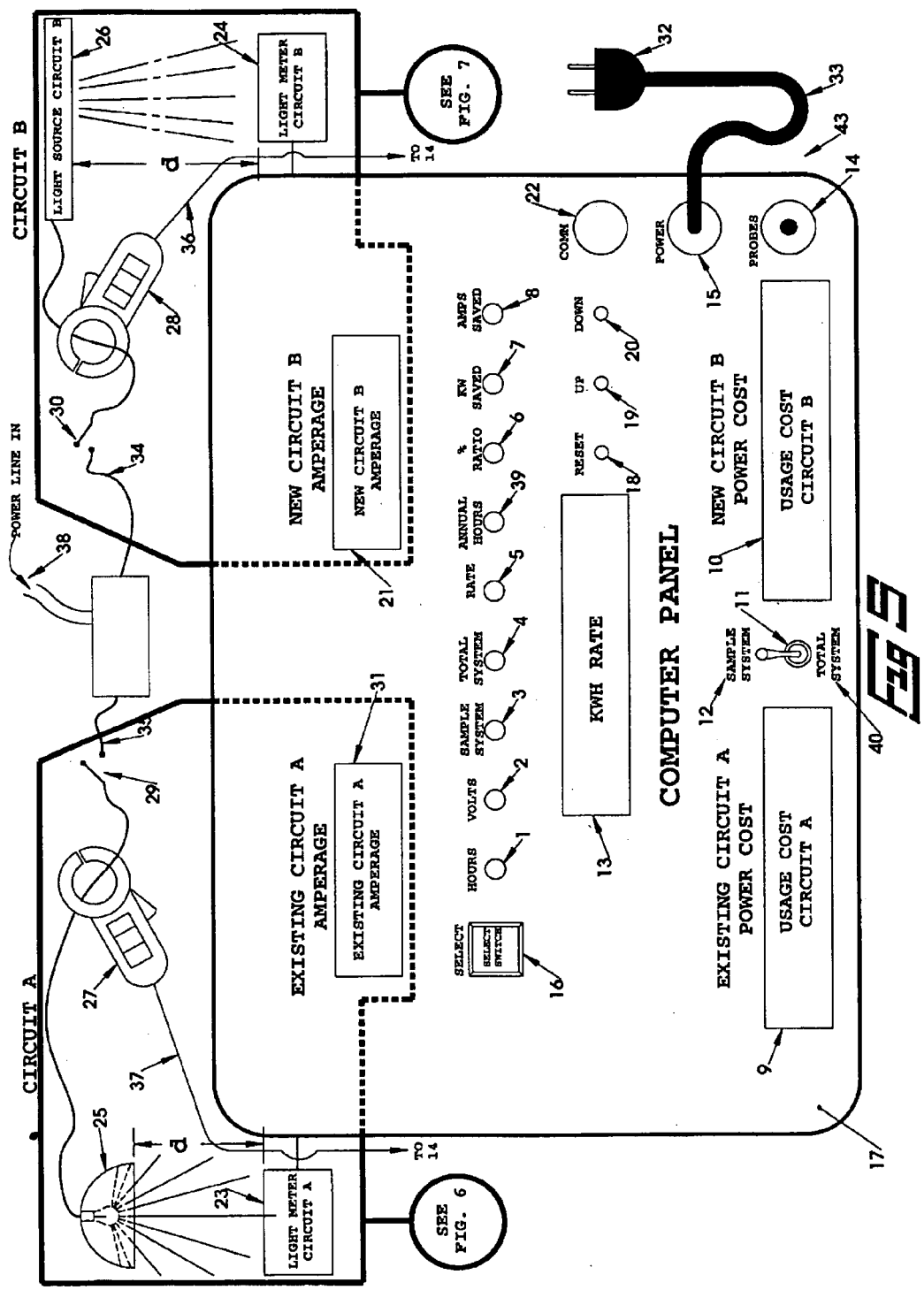

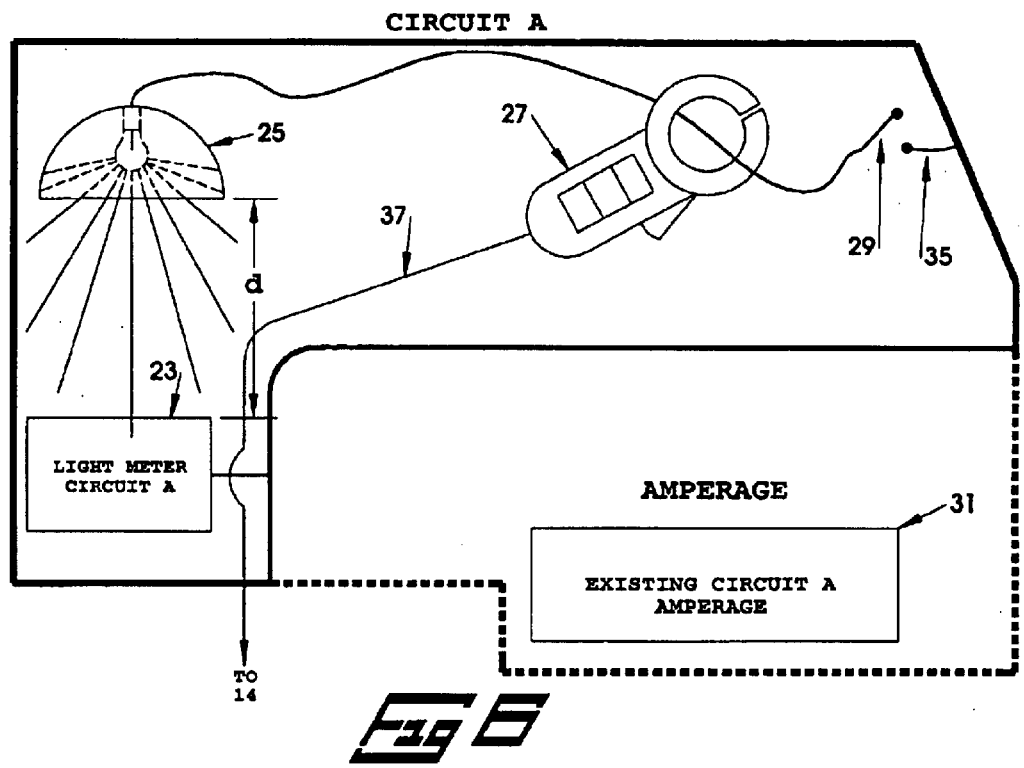
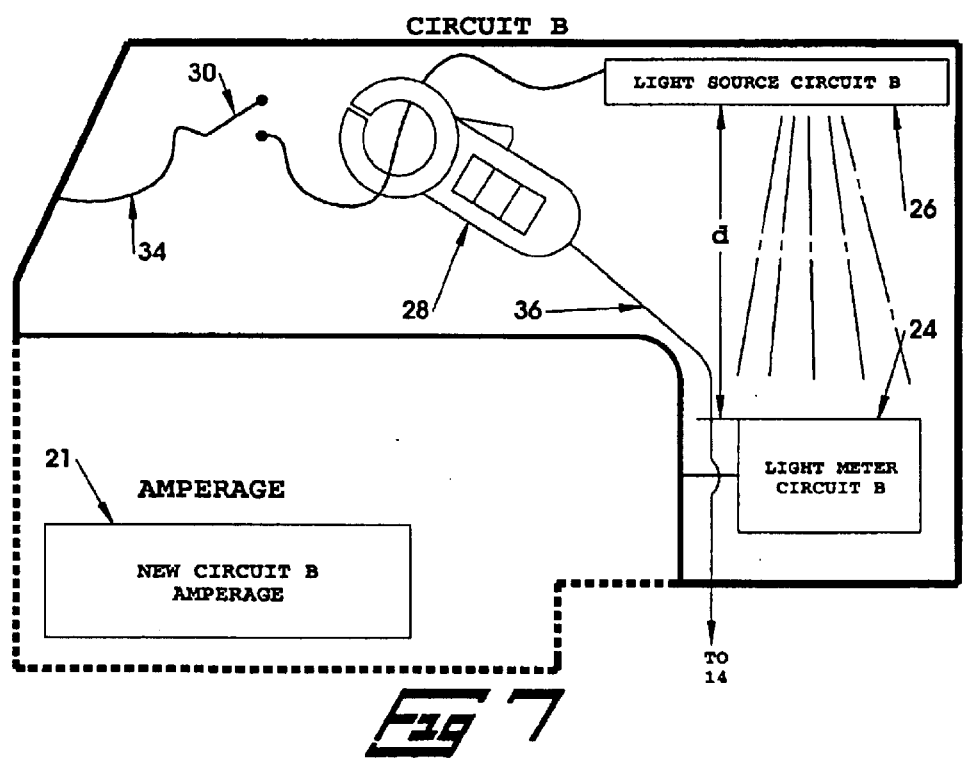

APPARATUS FOR AND METHOD OF METERING SEPARATE LIGHTING CIRCUITS FOR COMPARATIVE ELECTRIC POWER USAGE TO PROVIDE A VIRTUAL POWER PLANT IN ELECTRIC POWER SAVINGS

This is a CONTINUATION-IN-PART of application having a filing date of Aug. 05, 2002, Ser. No. 10/211,851 is a continuation-in-part of application Ser. No. 10/166,541 filed Jun. 11, 2002 and having the same inventors for patent application for; "APPARATUS AND METHOD FOR COMPARISON OF ELECTRIC POWER EFFICIENCY OF LIGHTING SOURCES"

SUBJECT OF THE INVENTION

This invention is to disclose apparatus to meter two separate electric circuits to provide a comparison of the kilowatts or amperage of each of the two circuits and to monitor each circuit for lowest electric power demand to provide equal room lighting, and the meter apparatus provides data for each circuit, for comparison of electric power usage to calculate lowest cost of the lighting circuit.

OBJECTS OF THE INVENTION

An object of this invention is to disclose apparatus for comparative analysis of two electric lighting circuits to measure, or meter, the electric energy demand of each of the two circuits.

Another object is to disclose a method for comparative analysis of electric power usage of two electric lighting circuits.

Another object is to disclose a method for comparative analysis of electric power usage of two electric lighting circuits, one circuit having incandescent or high intensity discharge (HID) light source and the other circuit having for example a fluorescent light source.

BRIEF DESCRIPTION OF DRAWINGS

Description

FIG. 1. Single point incandescent or HID light source (elevation view).

FIG. 2. Single point incandescent or HID light source (plan view)

FIG. 3. Area fluorescent light source. (elevation view)

FIG. 4. Area fluorescent light source. (plan view).

FIG. 5. Meter computer panel

FIG. 6. Circuit A. (Standard or existing incandescent or HID light source)

FIG. 7. Circuit B. (Comparison fluorescent light, or sample new light system)

| LEGEND | DESCRIPTION |
|---|---|
| 1 | Hours. |
| 2 | Volts. |
| 3 | Sample. |
| 4 | Total. |
| 5 | Rate. |
| 6 | % savings |
| 7 | KW Saved. |
| 8 | Amps. saved. |

-continued

| LEGEND | DESCRIPTION |
|---|---|
| 9 | Usage cost circuit A. |
| 10 | Usage cost circuit B |
| 11 | Toggle switch. |
| 12 | Sample system. Circuit B. |
| 13 | Display KWH rate. |
| 14 | Female opening for volt-ammeter clamp plug in. |
| 15 | Power. |
| 16 | Select. |
| 17 | Panel mount board. |
| 18 | Re-set voltage. |
| 19 | Up voltage adjustment; |
| 20 | Down voltage adjustment; |
| 21 | Ampere reading circuit B. (amps x volts x total fixtures = total KW.) |
| 22 | Female opening for communication plug in. |
| 23, | Light meter at circuit A light source. |
| 24, | Light meter at circuit B light source. |
| 25 | Light source circuit A. |
| 26 | Light source circuit B. |
| 27, | Circuit A clamp-on ammeter. |
| 28, | Circuit B clamp-on ammeter. |
| 29 | Switch in circuit A power line. |
| 30 | Switch in circuit B power line. |
| 31 | Ampere reading circuit A. (amps x volts x total fixtures = total KW.) |
| 32 | Plug into electric power source for computer. |
| 33 | Electric power line to computer. |
| 34 | Electric power line circuit B, to fluorescent ligh fixture. |
| 35 | Electric power line to circuit A, to incandescent light. |
| 36 | Clamp-on ammeter line, circuit B to computer. |
| 37 | Clamp-on ammeter line, circuit A, to computer. |
| 38 | Electric power line into circuits A and B. |
| 39 | Annual hours |
| 40 | Total system |
| 41 | Incandescent or HID light bulb. |
| 42 | Fluorescent light tubes. |
| 43 | Computer. |
| d | Distance from light fixture lighting face to light meter face. |
| A | Circuit A light standard. (see FIG. 6) |
| B | Circuit B light for comparison to standard light in circuit A; (see FIG. 7) |

DETAILED DESCRIPTION OF THE INVENTION

In all of the following discussion the term "incandescent" is to include as an alternate HID "high intensity discharge", or other light source, for comparison of electric power efficiency, and this invention is to describe and claim both apparatus and method for comparison of lighting sources, to provide for the most efficient based on electric power demand for equal or adequate lighting at the work plane, and to thus save electric power to provide a virtual power plant through savings in electric power for lighting of the work place.

Referring now to FIG. 1 showing elevation view of single point incandescent light source 25, with electric power line 35, to an incandescent or HID light bulb 41. FIG. 2 is a plan view of the single point incandescent or HID light source of FIG. 1.

FIG. 3 is an elevation view of area fluorescent light source 26 with electric power line 34 to this light source 26. FIG. 4 is a plan view of this fluorescent light source 26, and fluorescent light tubes 42.

FIG. 5 is an assembly, of the apparatus and computer, for and method of comparing electric power demand of different lighting sources, and FIGS. 6 and 7 are enlarged segments of the apparatus, with FIG. 6, identified as "A" —circuit A lighting standard and FIG. 7, identified as "B" —circuit B light for comparison to standard light in circuit A. The light source in circuit A is an incandescent or HID light 41, in lighting fixture 25, at a distance "d" from light meter 23, and on closing switch 29, in electric power line 35 the light intensity is indicated in light meter 23, and the amperage as indicated in circuit A by clamp-on ammeter 27, and the amperage is shown in window 31, in panel mount board 17 of the computer 43.

Referring now to circuit B shown in FIGS. 5 and 7, the light source in circuit B may be fluorescent tubes 42 in light fixture 26, and this light source is at a distance "d" from light meter 24, and on closing switch 30, in circuit B power line 34 the light meter 24 shows the light intensity, and this light intensity in circuit B is adjusted to be the same as attained in circuit A, and on equal light intensity to circuit A, clamp-on ammeter 28 shows the amperage of circuit B in window 21, on panel mount board 17 of the computer 43.

Again referring to FIG. 5 the clamp-on ammeters are plugged into opening 14, in panel mount 17, on computer 43, and select switch 16 for scanning; hours 1, volts 2, circuit B or sample 3; total system 4; rate 5; annual hours 39; % ratio 6; kilowatts saved 7; amperes saved 8; and each of the scanner stops have an LED light, and data will show in window 13.

The volts may be set by reset switch 18, switch 19 goes to higher voltage, and switch 20 to lower voltage. On reading the amperage of circuit A the power cost will be shown in window 9, and the amperage of circuit B power cost will be shown in window 10. Toggle switch 11 can be switched "up" 12, to show total KW of circuit B, in window 10. Total KW of circuit A shows on moving toggle 11 "down" to 40, to show KW display in window 9. Electric power entrance 15 to computer is via electric power line 33 and male plug-in 32. Female opening 22 for communication plug-in. Clamp-on ammeter 27, of circuit A plugs into computer 43 via line 37, to probe opening 14 and clamp-on ammeter 28 of circuit B, plugs into computer 43 via line 36 to probe opening 14.

Electric power line 38 connects to both circuit A and circuit B, and line 37 from clamp-on ammeter 27, in circuit A connects to the computer through female opening 14. Clamp-on ammeter 28 in circuit B connects to the computer via line 36 through female opening 14, which is an opening for probes of the clamp-on ammeters 27 and 28.

Circuit "B" can be considered a "sample" in which any other light source can be evaluated by comparison to the standard "incandescent" or "HID" light source of circuit A.

Referring now to the clamp-on ammeters 27 and 28, the clamp-on portion can be opened to allow surrounding of the power lines 35 and 34 respectively, then closing the clamp around the respective power line to get the ampere reading which will show in windows 31 and 21 respectively.

Method of metering separate electric lighting circuits for comparative electric power usage, to provide a virtual power plant in electric power savings, an electric power line 35 to a light source 25 in a circuit A and a switch 29 in the electric power line 35 to the light source in circuit A, and closing the switch 29 on the electric power line 35, and an electric power line 34 to a light source 26 in circuit B and a switch 30 in the electric power line 34 to the light source in said circuit B, and closing the switch 30 in the electric power line 34.

A light meter 23 at a distance d from light source of circuit A, and the direct light source 25 aimed at light meter 23 of the circuit A, and a light meter 24, at a distance d from direct light 26 source of circuit B, and the light source of circuit B aimed at the light meter 24 of the circuit B.

A clamp-on ammeter 27 and clamp of the ammeter surrounding the electric power line 35 to the light source 25 of the circuit A, the clamp-on ammeter 27 connected into a computer 43 through a female opening 14 in the panel of the computer 43. A clamp-on ammeter 28 and clamp of the ammeter 28 surrounding the electric power line 34 to the light source 26 of the circuit B, and the clamp-on ammeter, of circuit B, connected into the computer through a female opening 14 in the panel 17 of the computer 43.

A circuit A amperage reading window 31 in the panel 17 of the computer, and a circuit B amperage reading window 21 in the panel 17 of the computer 43.

A select switch 16 in the panel 17 of the computer 43, and the select switch 16 scans the selections of hours 1, volts 2, sample system circuit B amperes 3, total system amperes 4, KWH rate 5, annual hours 39, % ratio 6, KW saved 7, amperes saved 8, and each selection made is indicated by a light emitting diode (LED) at its site, and the data may be shown, by LED light in one of the windows 9,10,13,21 or 31.

A window 13 in the panel 17 of the computer 43 to display data scanned.

A voltage reset switch 18 to switch to higher voltage switch 19 and a switch 20 to lower voltage, in the panel 17 of the computer 43.

A window 9 to display power cost of the circuit A. A window 10 to display power cost of the circuit B.

A toggle switch 11 in "up" position 12 to show power cost of the circuit B in total light fixtures and the toggle switch 11 in "down" position 40 to show power cost of the circuit A in total fixtures, and an electric power supply plug 32 and power line 33 in the panel 17 of the computer 43, and a female opening 22 for communication plug-in on the panel 17 of the computer.

It is further to be pointed out that "LED" stands for light emitting diode, in the above description, and that "HID" identifies and stands for "high intensity discharge" light source.

Referring to FIG. 7, circuit B, other sources of light may be inserted in this circuit, for comparison with circuit A, thus this may be considered as a sampling circuit for any light source.

We claim:

1. An apparatus for metering separate electric lighting circuits for comparative electric power usage, to provide a virtual power plant in electric power savings comprising:

a—an electric power line to a light source in a circuit A and a switch in said electric power line to said light source in circuit A, b—an electric power line to a light source in a circuit B and a switch in said electric power line to said light source in said circuit B, c—a light meter at a distance d from direct light source of circuit A, d—a light meter at a distance d from direct light source of circuit B, e—a clamp-on ammeter and clamp of said ammeter surrounding said electric power line to said light source of said circuit A, said clamp-on ammeter connected into a computer through a probe opening in a panel of said computer, f—a clamp-on ammeter and clamp of said ammeter surrounding said electric power line to said light source of said circuit B, said clamp-on ammeter, of said circuit B, connected into said computer through a probe opening in said panel of said computer, g—a circuit A amperage reading window in said panel of said computer, h—a circuit B amperage reading window in said panel of said computer, i—a select switch in said panel of said computer, and said select switch to scan the selections of hours, volts, circuit B amperes, total amperes all fixture lights, KW rate % ratio, KW saved, amperes saved, j—a window in said panel of said computer to display data scanned, k—a voltage reset switch to switch to higher voltage and a switch to lower voltage, in said panel of said computer, l—a window to display power cost of said circuit A, m—a window to display power cost of said circuit B, n—a toggle switch in up position to show power cost of said circuit B in total, o—said toggle switch in down position to show power cost of said circuit A in total and, p—electric power plug in said panel of said computer, and a probe opening for communication plug-in on said panel of said computer.

2. Method of metering separate electric lighting circuits for comparative electric power usage, to provide a virtual power plant in electric power savings comprising:

a—an electric power line to a light source in a circuit A and a switch in said electric power line to said light source in circuit A, and closing said switch on said electric power line, b—an electric power line to a light source in a circuit B and a switch in said electric power line to said light source in said circuit B, and closing said switch in said electric power line, c—a light meter at a distance d from direct light source of circuit A, and said direct light source aimed at said light meter of said circuit A, d—a light meter at a distance d from direct light source of circuit B, and said direct light source of said circuit B aimed at said light meter of said circuit B e—a clamp-on ammeter and clamp of said ammeter surrounding said electric power line to said light source of said circuit A, said clamp-on ammeter connected into a computer through a probe opening in a panel of said computer, f—a clamp-on ammeter and clamp of said ammeter surrounding said electric power line to said direct light source of said circuit B, said clamp-on ammeter, of circuit B, connected into said computer through a probe opening in said panel of said computer, g—a circuit A amperage reading window in said panel of said computer, h—a circuit B amperage reading window in said panel of said computer, i—a select switch in said panel of said computer, and said select switch to scan the selections of hours, volts, circuit B amperes, total amperes all fixture lights, KW rate % ratio, KW saved, amperes saved, j—a window in said panel of said computer to display data scanned, k—a voltage reset switch to switch to higher voltage and a switch to lower voltage, in said panel of said computer, l—a window to display power cost of said circuit A, m—a window to display power cost of said circuit B, n—a toggle switch in up position to show power cost of said circuit B in total, o—said toggle switch in down position to show power cost of said circuit A in total and, p—electric power plug in said panel of said computer, and a probe opening for communication plug-in on said panel of said computer.

3. The method of metering separate electric lighting circuits for comparative electric power usage, to provide a virtual power plant in electric power savings of claim 2 further comprising:

a—said light source of said circuit A includes an incandescent light source and, b—a fluorescent light tube source in said circuit B.

4. The method of metering separate electric lighting circuits for comparative electric power usage, to provide a virtual power plant in electric power savings of claim 2 further comprising:

a—said light source of said circuit A includes an "HID" high intensity discharge light source and, b—a fluorescent light tube source in said circuit B.

* * * * *